(12) United States Patent
Kim et al.

(10) Patent No.: US 11,982,934 B2
(45) Date of Patent: May 14, 2024

(54) CAMERA MODULE

(71) Applicant: LG INNOTEK CO., LTD., Seoul (KR)

(72) Inventors: Chang Yeon Kim, Seoul (KR); Kyung Won Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 359 days.

(21) Appl. No.: 17/271,728

(22) PCT Filed: Sep. 5, 2019

(86) PCT No.: PCT/KR2019/011484
§ 371 (c)(1),
(2) Date: Feb. 26, 2021

(87) PCT Pub. No.: WO2020/050650
PCT Pub. Date: Mar. 12, 2020

(65) Prior Publication Data
US 2021/0318592 A1 Oct. 14, 2021

(30) Foreign Application Priority Data

Sep. 5, 2018 (KR) ........................ 10-2018-0106210

(51) Int. Cl.
*G03B 5/06* (2021.01)
*G02B 27/64* (2006.01)

(52) U.S. Cl.
CPC ............ *G03B 5/06* (2013.01); *G02B 27/646* (2013.01); *G03B 2205/0023* (2013.01)

(58) Field of Classification Search
CPC . G03B 5/06; G03B 2205/0023; G02B 27/646
See application file for complete search history.

(56) References Cited

U.S. PATENT DOCUMENTS 6,734,914 B1 5/2004 Nishimura et al.
7,209,164 B2 4/2007 Nishimura et al.
(Continued)

FOREIGN PATENT DOCUMENTS

CN 106054494 A 10/2016
CN 106597630 A 4/2017
(Continued)

OTHER PUBLICATIONS

International Search Report, issued in PCT/KR2019/011484, dated Dec. 20, 2019.

*Primary Examiner* — Cara E Rakowski
(74) *Attorney, Agent, or Firm* — Birch, Stewart, Kolasch & Birch, LLP

(57) ABSTRACT

An embodiment relates to a camera module and a driving device for a camera module. A camera module according to an embodiment may comprise: a lens module; a first bracket including a first round surface and movable by being coupled to the lens module; a second bracket including a second round surface corresponding to the first round surface; a ball bearing disposed between the first round surface of the first bracket and the second round surface of the second bracket; and a driving unit disposed between the lens module and the second bracket. The width and height of the second round surface of the second bracket may be greater than the width and height of the first round surface of the first bracket.

17 Claims, 12 Drawing Sheets

(56) References Cited

U.S. PATENT DOCUMENTS

| | | | |
|---|---|---|---|
| 10,884,215 B2 | 1/2021 | Kuo et al. | |
| 2004/0190863 A1 | 9/2004 | Nishimura et al. | |
| 2014/0119717 A1* | 5/2014 | Yasuda | G02B 27/646 |
| | | | 396/55 |
| 2015/0138381 A1 | 5/2015 | Ahn | |
| 2015/0195460 A1* | 7/2015 | Yasuda | H04N 23/687 |
| | | | 359/557 |
| 2015/0256727 A1 | 9/2015 | Kim et al. | |
| 2016/0299349 A1 | 10/2016 | Cho et al. | |
| 2017/0003516 A1* | 1/2017 | Kiyamura | G02B 27/646 |
| | | | 359/557 |
| 2017/0017093 A1* | 1/2017 | Minamisawa | G02B 27/646 |
| 2017/0108660 A1 | 4/2017 | Kuo et al. | |
| 2018/0109660 A1 | 4/2018 | Yoon et al. | |
| 2018/0239162 A1 | 8/2018 | Lee et al. | |
| 2019/0064476 A1* | 2/2019 | Matsuhisa | H04N 23/55 |
| 2019/0196137 A1* | 6/2019 | Ushioda | G02B 27/646 |

FOREIGN PATENT DOCUMENTS

| | | |
|---|---|---|
| CN | 108156367 A | 6/2018 |
| JP | 7-234447 A | 9/1995 |
| JP | 2000-165738 A | 6/2000 |
| JP | 2005-303490 A | 10/2005 |
| KR | 10-2009-0039387 A | 4/2009 |
| KR | 10-2013-0015666 A | 2/2013 |
| KR | 10-1297665 B1 | 8/2013 |
| KR | 10-2017-0019284 A | 2/2017 |
| KR | 10-2017-0054112 A | 5/2017 |
| KR | 10-1794582 B1 | 11/2017 |

* cited by examiner

[FIG. 1a]
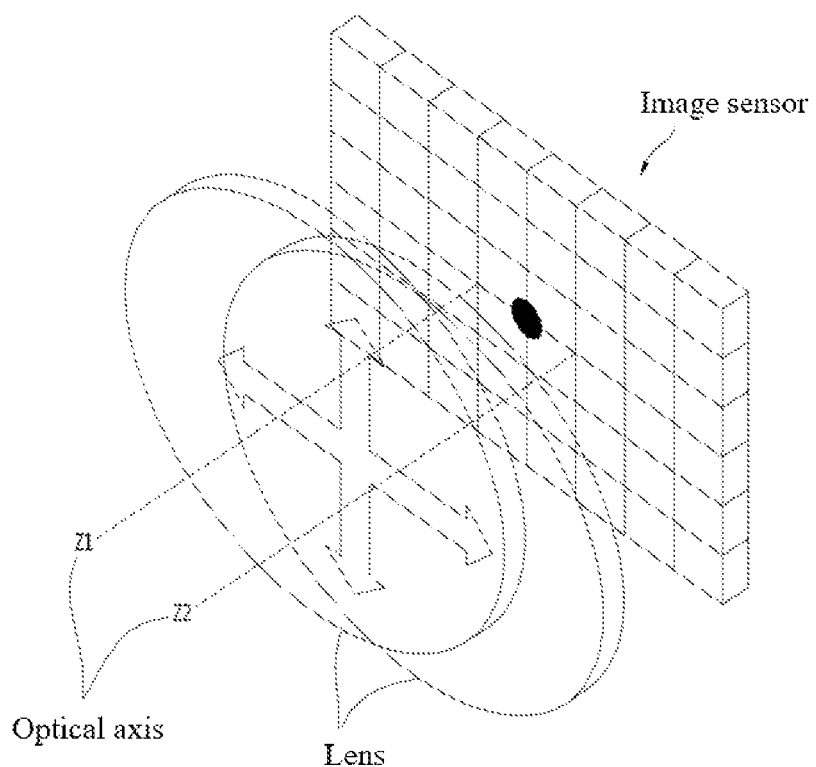

[FIG. 1b]
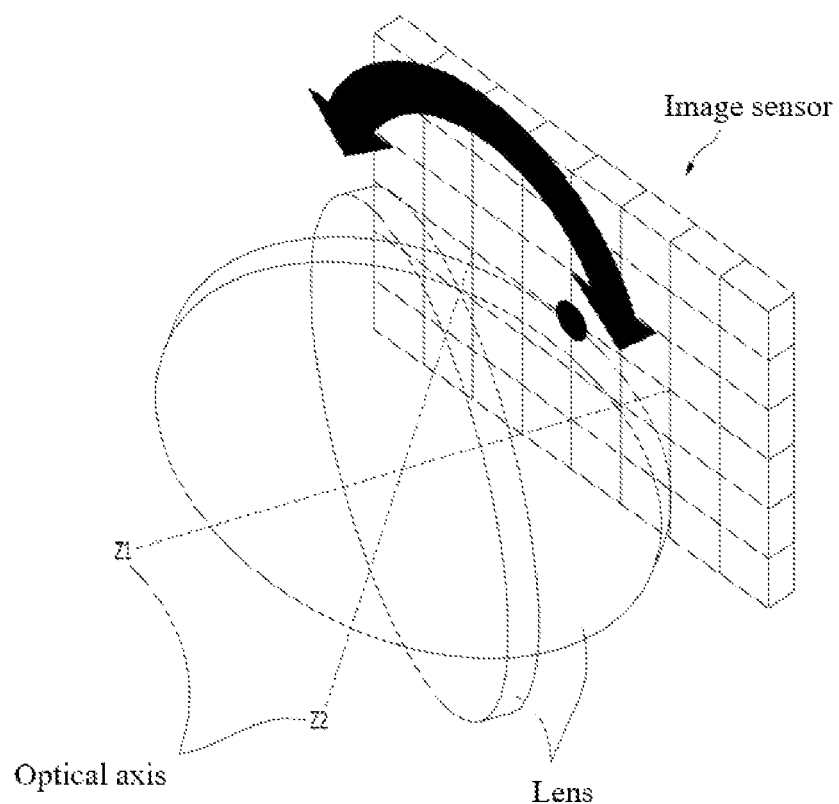

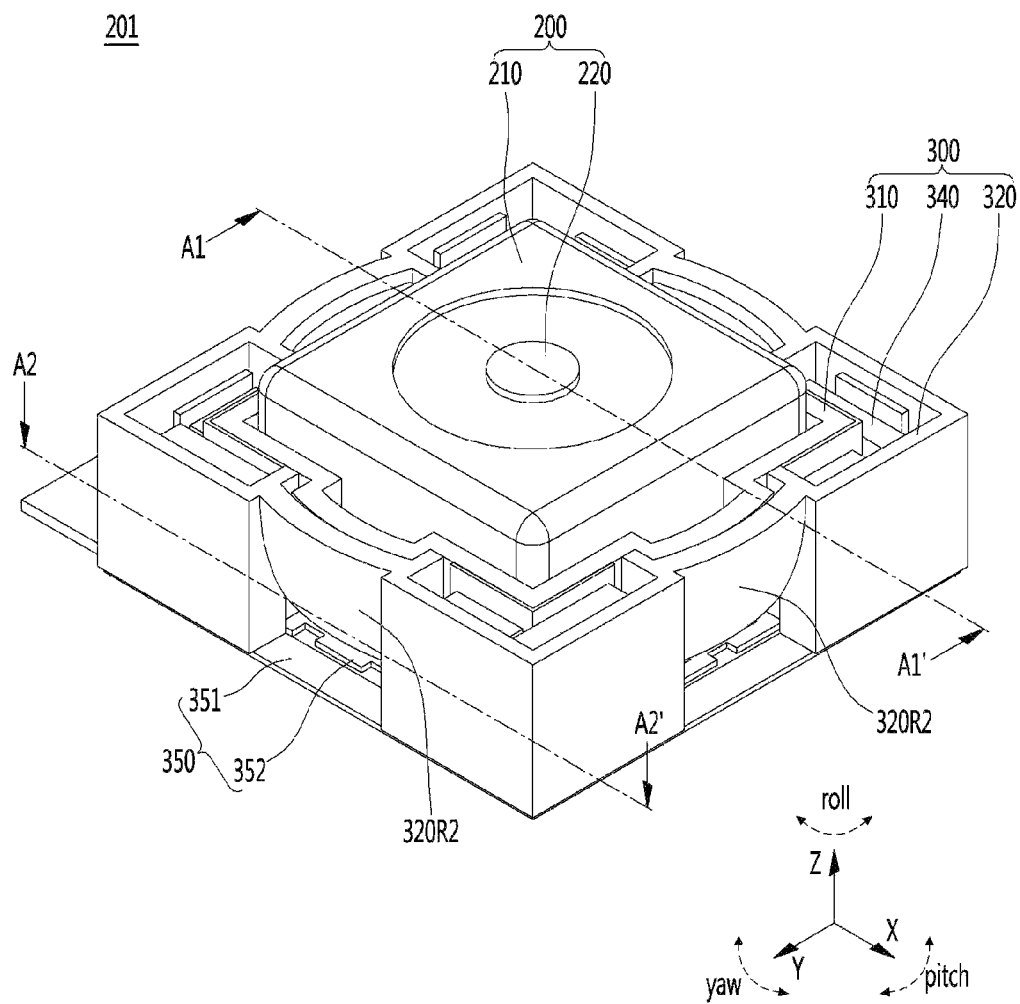
【FIG. 2a】

[FIG. 2b]
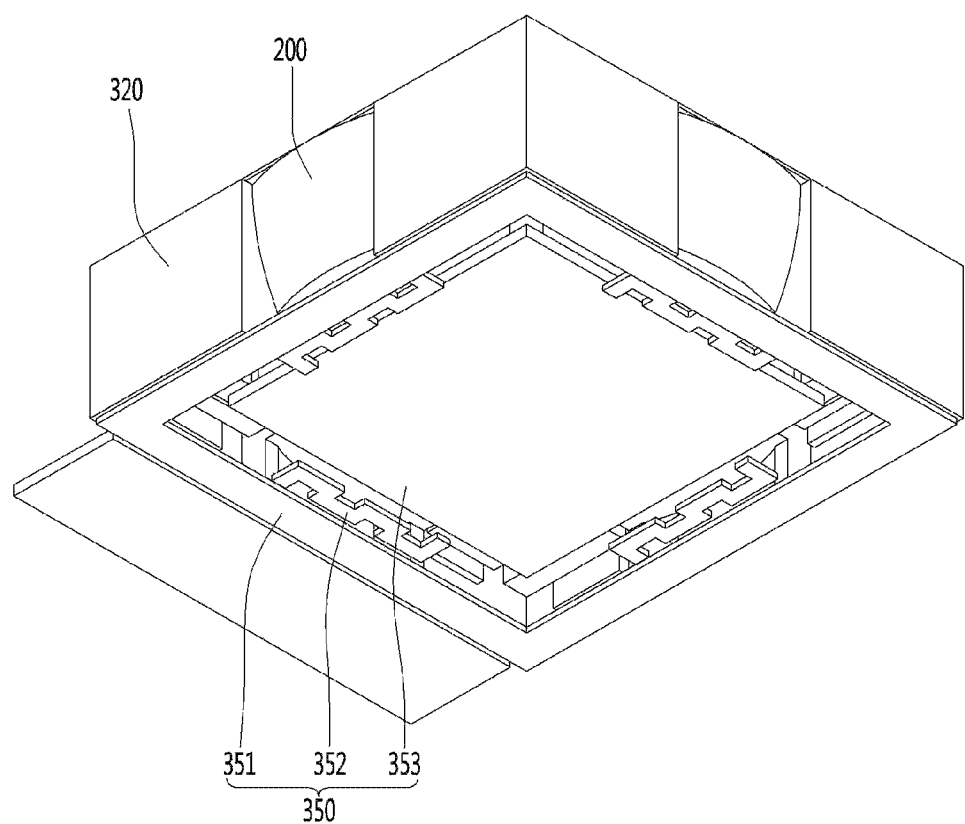

[FIG. 3]
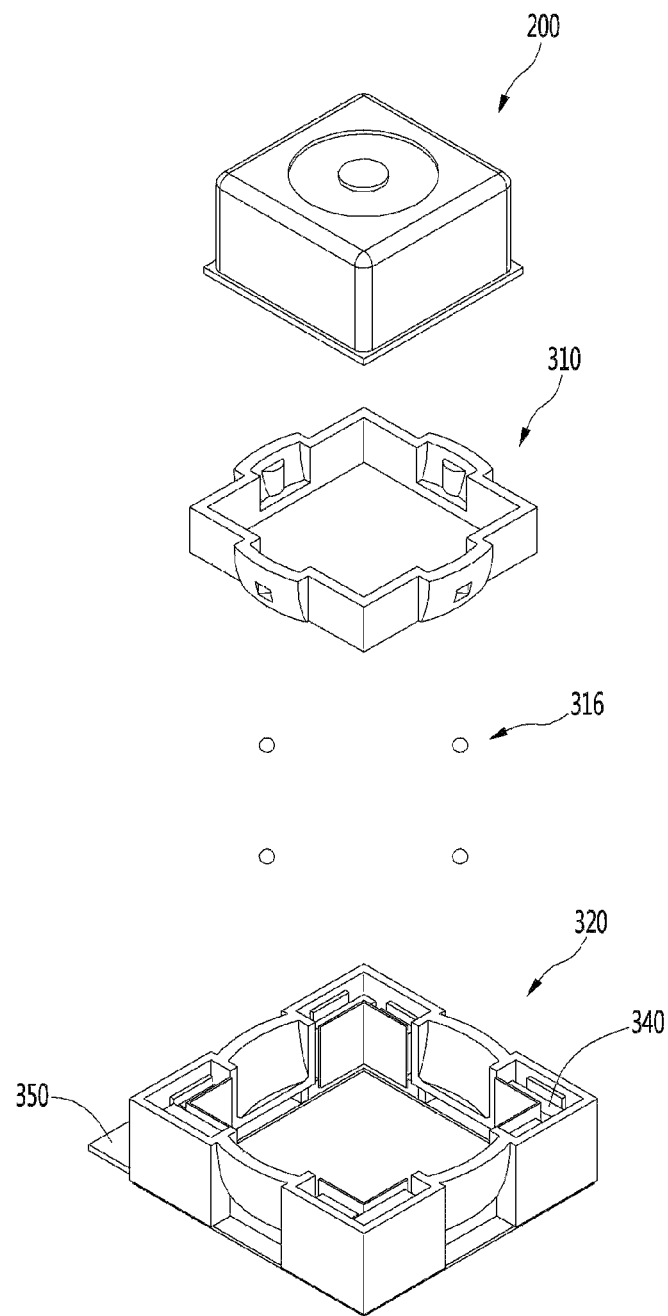

【FIG. 4a】
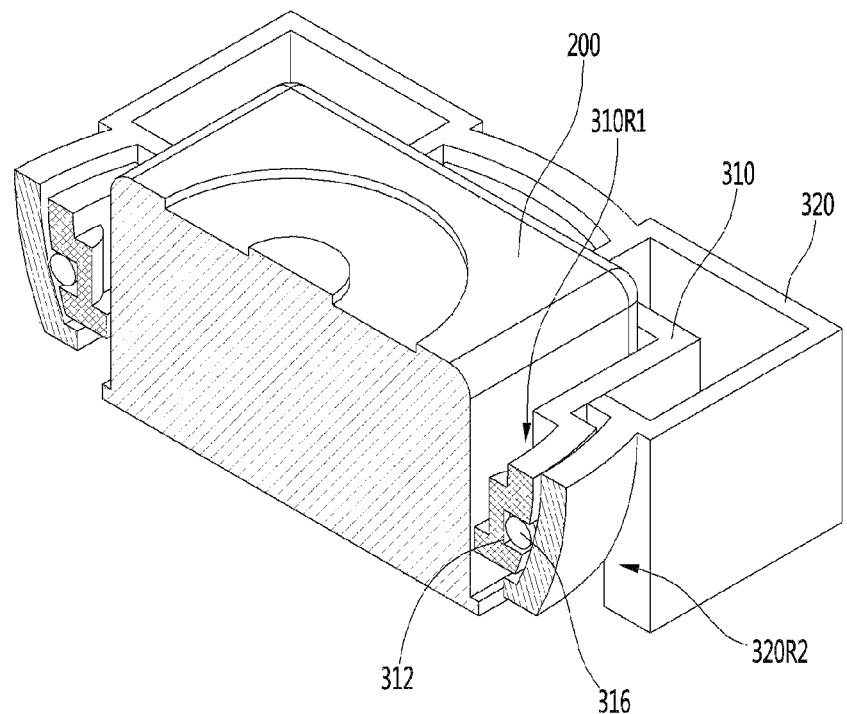
【FIG. 4b】
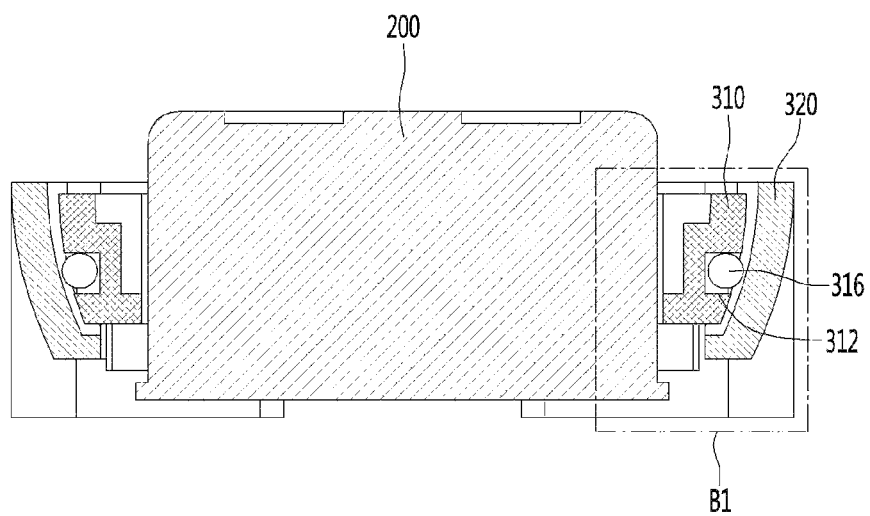

[FIG. 5]
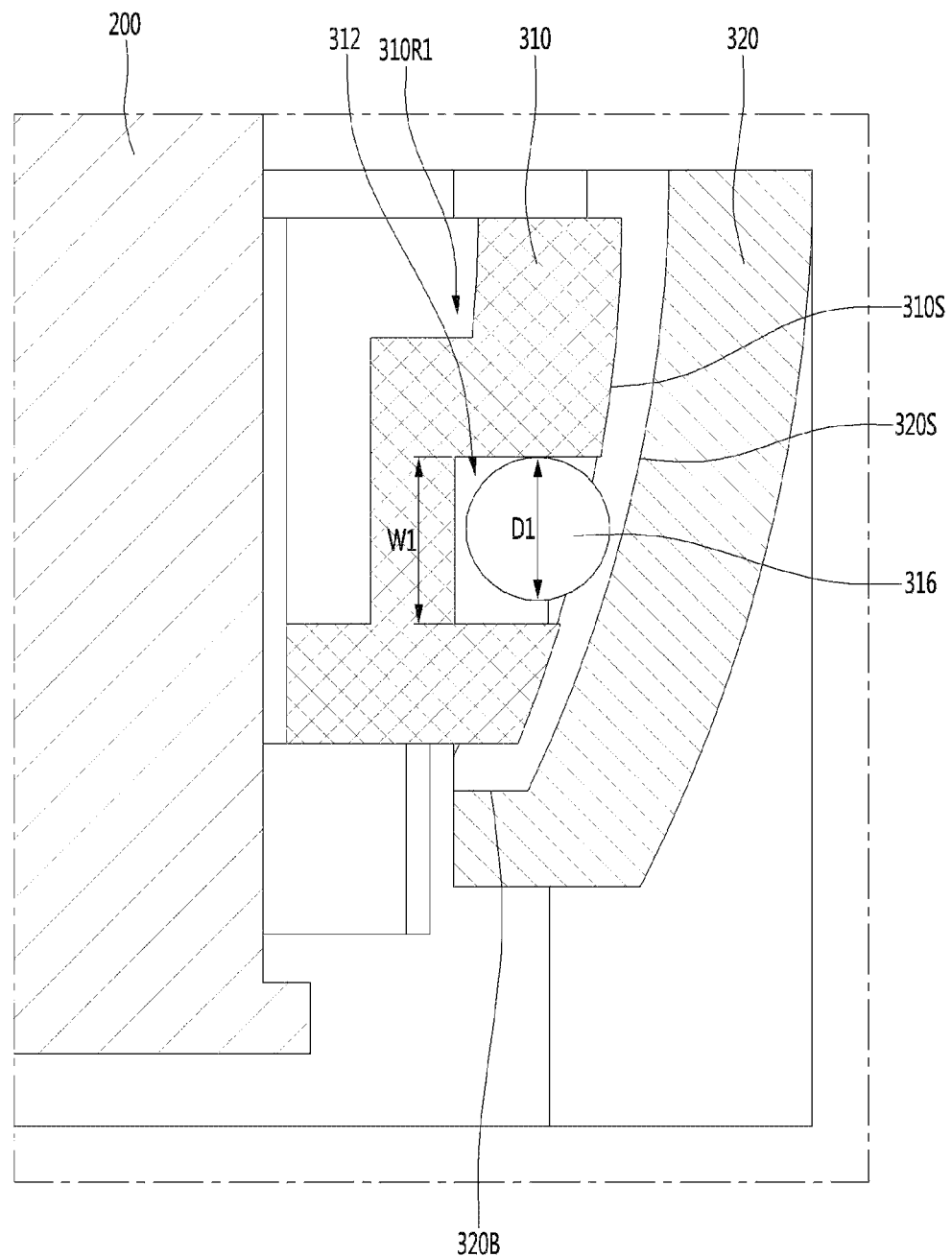

[FIG. 6a]
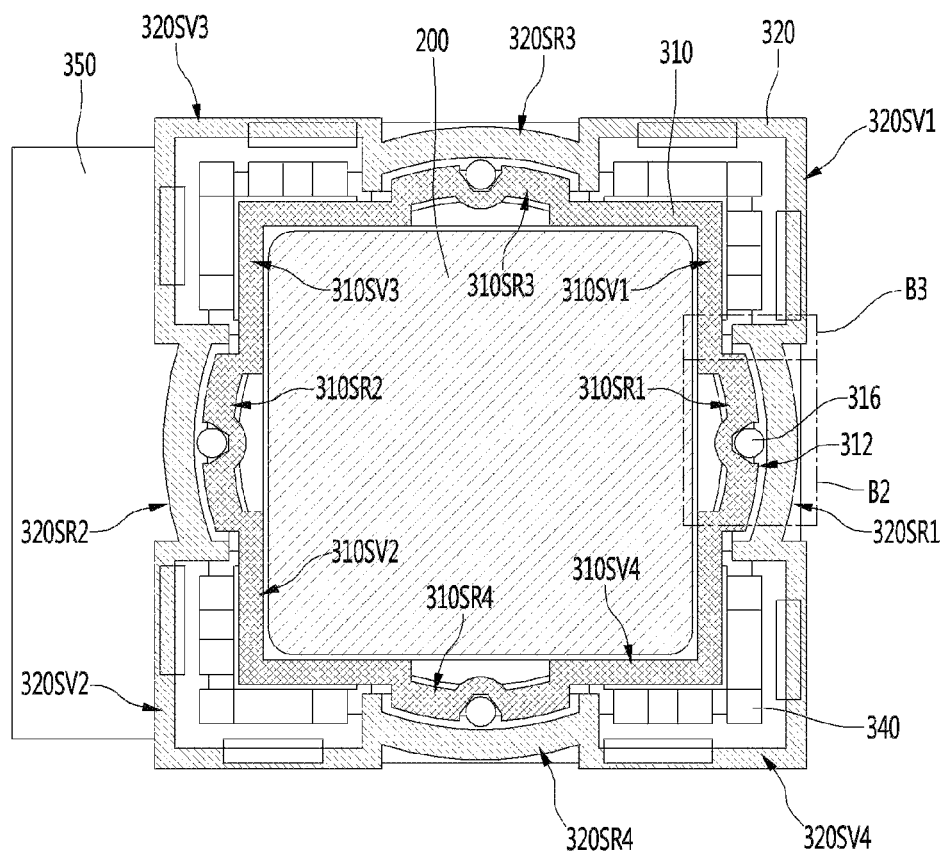

[FIG. 6b]
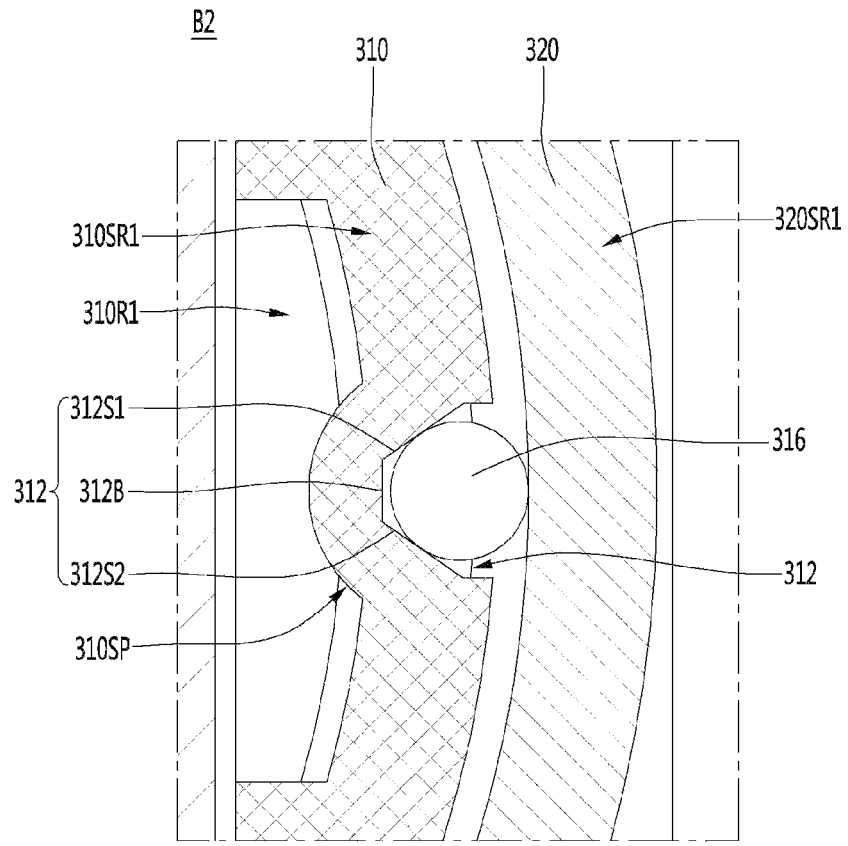
[FIG. 6c]
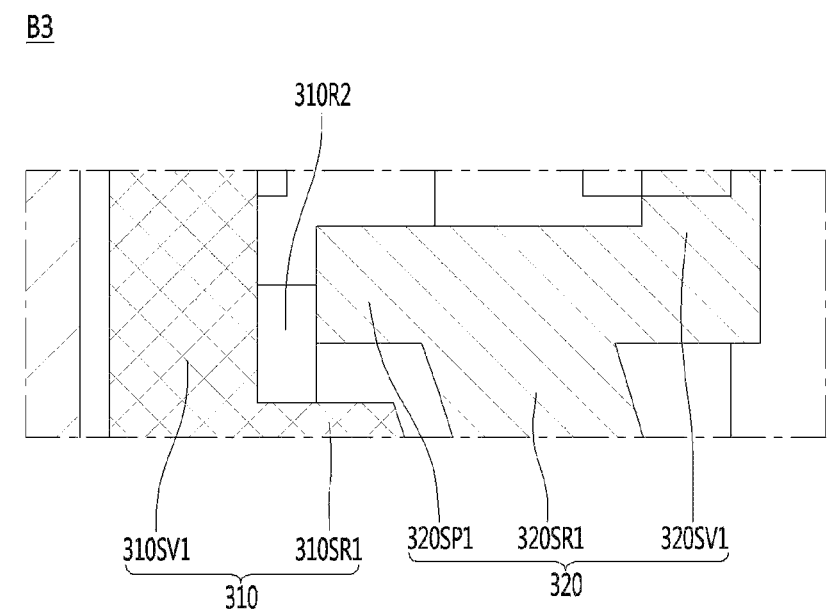

【FIG. 7】
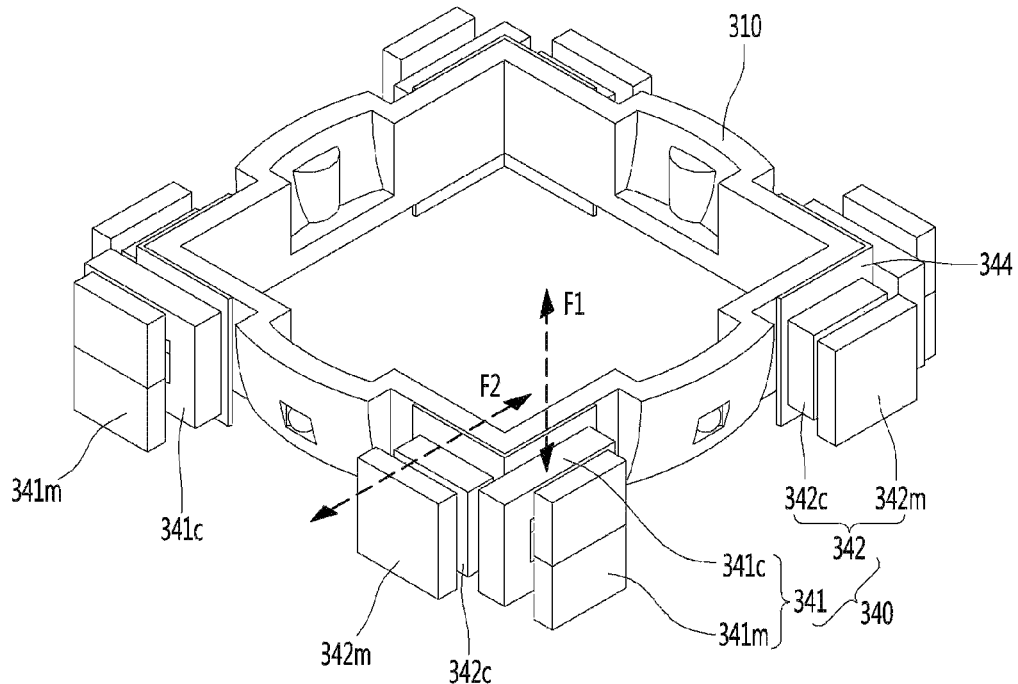
【FIG. 8a】
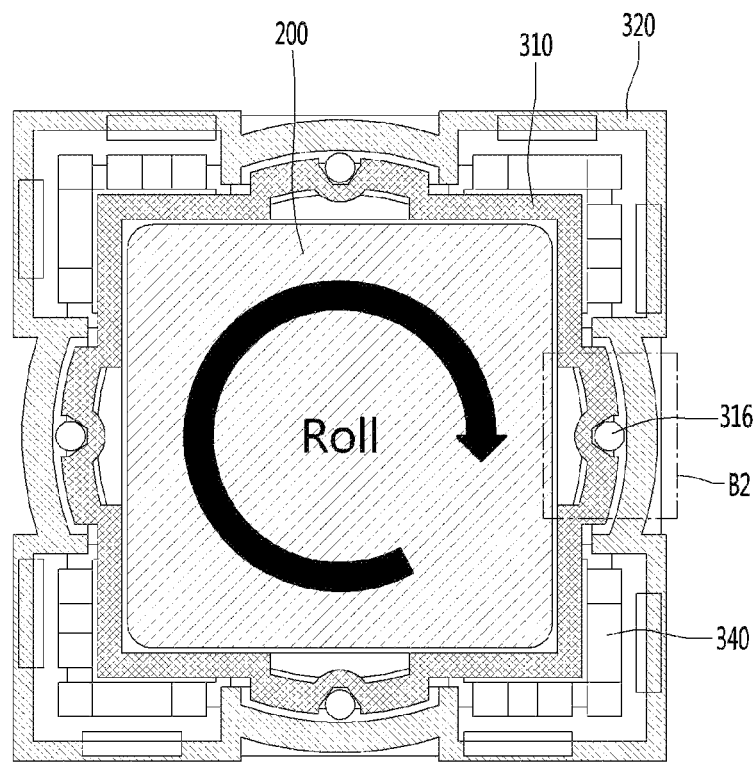

【FIG. 8b】
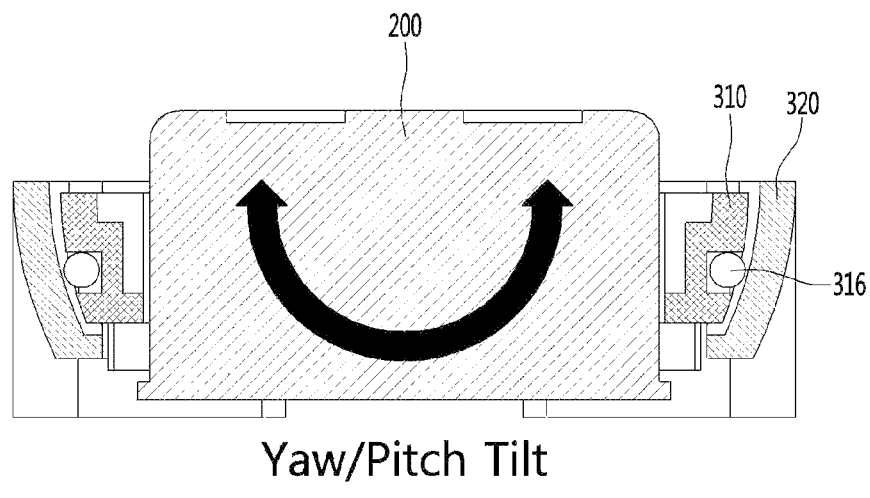
Yaw/Pitch Tilt
【FIG. 9】
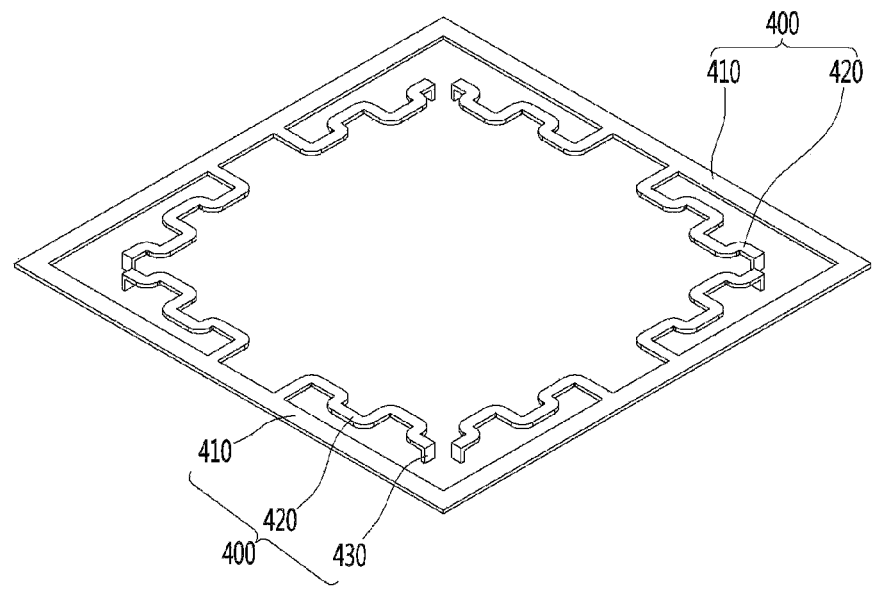

[FIG. 10]
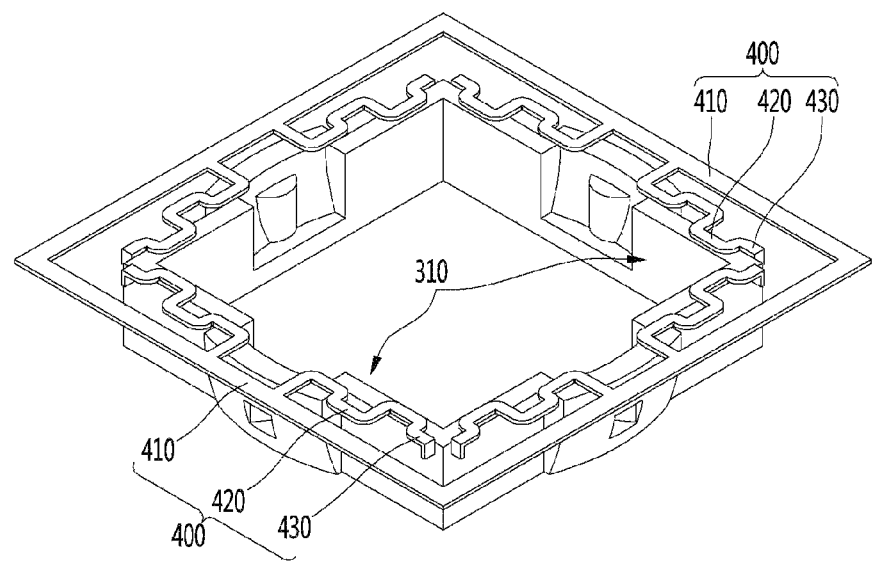

CAMERA MODULE

CROSS REFERENCE TO RELATED APPLICATIONS

This application is the National Phase of PCT International Application No. PCT/KR2019/011484, filed on Sep. 5, 2019, which claims priority under 35 U.S.C. 119(a) to Patent Application No. 10-2018-0106210, filed in the Republic of Korea on Sep. 5, 2018, all of which are hereby expressly incorporated by reference into the present application.

TECHNICAL FIELD

The embodiment relates to a camera actuator and a camera module including the same.

BACKGROUND ART

The camera module performs a function of photographing a subject and storing it as an image or video, and is mounted on a mobile terminal such as a mobile phone, a laptop computer, a drone, or a vehicle, etc.

On the other hand, portable devices such as smartphones, tablet PCs, and laptops have built-in micro camera modules, and these camera modules automatically adjust the distance between the image sensor and the lens to align the focal length of the lens such that Auto-Focus (AF) function can be performed.

For example, a recent camera module can perform a zooming function of zooming up or zooming out by increasing or decreasing the magnification of a distant subject through a zoom lens.

In addition, recently, camera modules employ image stabilization (IS) technology to correct or prevent image shake due to unstable fixing devices or camera movement caused by user movement. These IS technologies include Optical Image Stabilizer (OIS) technology and anti-shake technology using an image sensor.

The OIS technology is a technology that corrects motion by changing the path of light, and an anti-shake technology using an image sensor is a technology that corrects movement in a mechanical and electronic manner, and the OIS technology is more widely adopted.

On the other hand, the image sensor has a higher resolution as it goes to a higher pixel, so that the size of the pixel decreases. However, as the pixel becomes smaller, the amount of light received at the same time decreases. Therefore, in a dark environment, the higher the pixel camera, the more severe the blurring of the image due to hand shake appears as the shutter speed decreases.

Accordingly, in order to capture an image without distortion using a high-pixel camera in a dark night or especially in a video, the OIS function has recently been essentially adopted.

On the other hand, the OIS technology is a method of correcting the image quality by correcting the optical path by moving the lens or image sensor of the camera. The OIS technology detects camera movement with a gyro sensor. Based on this, the distance the lens or image sensor should move is calculated. For example, the OIS correction method includes a lens shift method and a lens tilt method.

Meanwhile, video recording using a mobile phone camera has recently been widely used, and personal internet broadcasting through real-time video recording, such as Afreeca TV, is gaining popularity. When the OIS function is operated when recording such a video, the distortion of the video is rather severe, there is a problem of causing a rumbling to the user or the viewer.

For example, FIG. 1A is a conceptual diagram of an OIS through a lens movement method in a camera module of a related art, and FIG. 1B is a conceptual diagram of an OIS through a lens tilt method in a camera module of the related art.

Referring to FIG. 1A, in the case of the lens shift method in the related art, as the optical axis, which is the reference of the point with the spatial resolution (SFR) value in the image sensor, is repeatedly moved from Z1 to Z2 according to the movement of the lens. Distortion of the video is severe, and the situation is causing rumbling to users, etc., and this problem is also occurring in the sensor shift method.

In addition, referring to FIG. 1B, in the case of the conventional lens tilt method in the related art, as the optical axis is repeatedly shifted from Z1 to Z2 according to the tilting of the lens, the distance between the lens and the image sensor is changed. In addition, as the optical axis, which is the reference of the spatial resolution (SFR) value, moves, the distortion of the video is more severe. These problems happen in the sensor tilt method.

However, any appropriate technical solution to the problems mentioned above cannot be prepared.

Meanwhile, the OIS technology of the related art is complicated in structure because a mechanical actuator is required for lens movement, and a driving element or a gyro sensor must be mounted, so there is a limitation in implementing a micro camera module.

DISCLOSURE

Technical Problem

The embodiment is to provide a camera module and an actuator of the camera module capable of providing an excellent OIS function without distortion of an image even during video recording.

In addition, the embodiment is to solve the above-described technical problem and at the same time provide a micro camera module.

The technical problem of the embodiment is not limited to the content described in this item, and includes what is understood from the description of the invention.

Technical Solution

The camera module according to the embodiment includes a lens module, a first bracket including a first round surface and moving coupled with the lens module, a second bracket including a second round surface corresponding to the first round surface, a ball bearing disposed between the first round surface of the first bracket and the second round surface of the second bracket, and a driving unit disposed between the lens module and the second bracket.

The width and height of the second round surface of the second bracket may be greater than the width and height of the first round surface of the first bracket.

In addition, the camera module according to the embodiment includes a lens module, a first bracket including a first round surface and moving coupled with the lens module, a second bracket including a second round surface corresponding to the first round surface, a ball bearing disposed between the first round surface of the first bracket and the second round surface of the second bracket, and a driving unit disposed between the lens module and the second bracket.

The first round surface of the first bracket may include at least two first unit round surfaces, and the two first unit round surfaces may be disposed opposite to each other around the lens module.

The second round surface of the second bracket may include at least two second unit round surfaces, and each of the at least two second unit round surfaces may be disposed to correspond to each of the at least two first unit round surfaces.

In addition, the camera module according to the embodiment includes a lens module, a first bracket including a first round surface and moving coupled with the lens module to move, a second bracket including a second round surface corresponding to the first round surface, a ball bearing disposed between the first round surface of the first bracket and the second round surface of the second bracket, and a driving unit disposed between the lens module and the second bracket.

The lens module may rotate along the second round surface with respect to the optical axis, and the lens module may be driven vertically with respect to the optical axis along the second round surface.

In an embodiment, the ball bearing may move along the first round surface and the second round surface so that the lens module rotates with respect to the optical axis.

The ball bearing may move along the first round surface and the second round surface so that the lens module is tilted based on an imaginary plane perpendicular to the optical axis.

The first round surface may be disposed on an outer surface of the first bracket.

The second round surface may be disposed on an inner surface of the second bracket.

An upper end of the first bracket may be disposed lower than an upper end of the second bracket.

The first bracket includes a first recess region on an inner surface thereof and disposed at a position corresponding to the first round surface, and the second bracket includes a second recess region on an outer surface thereof and disposed at a position corresponding to the second round surface.

The embodiment further includes a circuit board disposed under the second bracket and controlling the driving unit, the circuit board including a rigid circuit board and a flexible circuit board, and a part of the flexible circuit board may be disposed in the second recess region of the second bracket.

The first bracket may include a ball receiving part in which the ball bearing is disposed, and the ball receiving part may be disposed at a position corresponding to the first recess region.

The driving unit may include a first driving unit generating electromagnetic force in an optical axis direction and a second driving unit generating electromagnetic force in a direction perpendicular to the optical axis direction.

The first driving unit includes a first coil unit coupled to the first bracket and a first magnet unit coupled to the second bracket, and the second driving unit includes a second coil unit coupled to the first bracket and include a second magnet portion coupled to the second bracket.

The first bracket may include a ball receiving part in which the ball bearing is disposed.

In addition, the camera module according to the embodiment may include a lens module; a first bracket supporting and driving the lens module; a second bracket accommodating the first bracket; a ball disposed between the first bracket and the second bracket; and a driving unit for driving the lens module.

In addition, the driving apparatus of the camera module according to the embodiment includes: a first bracket supporting and driving a predetermined lens module; a second bracket accommodating the first bracket; a driving unit driving the first bracket; and a circuit board for controlling the driving unit.

Advantageous Effects

The embodiment may provide a camera module capable of providing an excellent OIS function without distortion of an image even when capturing a video and an actuator for the camera module.

In addition, the embodiment has a technical effect capable of providing a micro-camera module at the same time as the technical effect described above.

In addition, the embodiment is a method of moving the entire module including the lens and the image sensor. Compared to the lens moving method, the embodiment has a technical effect in that the correction range is wider, and since the optical axis of the lens and the axis of the image sensor are not twisted, it is possible to minimize image deformation.

The technical effect of the embodiment is not limited to the content described in this item, and includes what is understood from the description of the invention.

DESCRIPTION OF DRAWINGS

FIG. 1A is a conceptual diagram of an OIS through a lens movement method in a camera module of a related art.

FIG. 1B is a conceptual diagram of OIS through a lens tilt method in a camera module of a related art.

FIG. 2A is a perspective view showing the camera module of the embodiment.

FIG. 2B is a bottom perspective view of the camera module of the embodiment.

FIG. 3 is an exploded perspective view of the camera module of the embodiment.

FIG. 4A is a cross-sectional perspective view taken along line A1-A1' of the camera module according to the embodiment shown in FIG. 2A.

FIG. 4B is a cross-sectional view taken along line A1-A1' of the camera module according to the embodiment shown in FIG. 2A.

FIG. 5 is a partially enlarged view of the first area B1 of the camera module according to the embodiment shown in FIG. 4B.

FIG. 6A is a cross-sectional view taken along line A2-A2' of the camera module according to the embodiment shown in FIG. 2A.

FIG. 6B is a partially enlarged view of the second area B2 of the camera module according to the embodiment shown in FIG. 6A.

FIG. 6C is a partially enlarged view of the third area B3 of the camera module according to the embodiment shown in FIG. 6A.

FIG. 7 is a perspective view of a first bracket and a driver in the camera module according to the embodiment shown in FIG. 2A.

FIGS. 8A and 8B are exemplary views of driving the camera module according to the embodiment.

FIG. 9 is an exemplary view of a spring in the camera module according to the embodiment.

FIG. 10 is an exemplary view of coupling a spring and a first bracket in the camera module according to the embodiment.

MODE FOR INVENTION

Hereinafter, embodiments will be described in detail with reference to the accompanying drawings. Since the embodiments can be modified in various ways and have various forms, specific embodiments will be illustrated in the drawings and described in detail in the text. However, this is not intended to limit the embodiments to a specific type of disclosure, and it should be understood that all changes, equivalents, and substitutes are included in the spirit and scope of the embodiments.

Terms such as "first" and "second" may be used to describe various elements, but the elements should not be limited by the terms. These terms are used for the purpose of distinguishing one component from another component. In addition, terms specifically defined in consideration of the configuration and operation of the embodiment are only for describing the embodiment, and do not limit the scope of the embodiment.

In the description of the embodiment, in the case of being described as being formed on "upper (top)" or "lower (under)" of each element, the upper (top) or lower (under) includes both elements in direct contact with each other or in which one or more other elements indirectly formed between the two elements. In addition, when expressed as "up (top)" or "on or under", the meaning of not only an upward direction but also a downward direction based on one element may be included.

In addition, relational terms such as "top/upper/above" and "bottom/lower/below" used below do not necessarily require or imply any physical or logical relationship or order between such entities or elements, it may be used to distinguish one entity or element from another entity or element.

Embodiment

FIG. 2A is a perspective view showing the camera module 201 of the embodiment, FIG. 2B is a bottom perspective view of the camera module 201 of the embodiment, and FIG. 3 is an exploded perspective view of the camera module 201 of the embodiment shown in FIG. 2A.

In an embodiment, a direction parallel to the optical axis of light may be referred to as the z-axis, and a plane perpendicular to the optical axis may be the xy plane, and in the xy plane, the x-axis and y-axis may be defined as mutually perpendicular directions, but it is not limited thereto. In this case, the x-axis may be defined as a horizontal coordinate axis and the y-axis may be defined as a vertical coordinate axis, but the present invention is not limited thereto.

The movement of the camera module may include a linear movement moving along an axis and a rotational movement rotating around the axis in a big view.

As shown in FIG. 2A, the rotational movement may include a pitch, which is a vertical rotational movement along the x-axis, which is the horizontal coordinate axis of the camera module, and a yaw, which is a horizontal rotational movement along the y-axis, which is the vertical coordinate axis of the camera module as the rotational axis and a roll, which is a rotational movement along the z-axis, which is an optical axis passing in the front and rear direction as the rotation axis. The pitch and yaw may be rotation in the x-axis or y-direction.

The camera module according to the embodiment may be applied to both the front or rear, the bottom and the rear of the mobile phone.

Firstly referring to FIG. 3, FIG. 3 is an exploded perspective view of the camera module 201 of the embodiment shown in FIG. 2A. The camera module 201 of the embodiment may include a lens module 200, a first bracket 310, a ball bearing 316, a second bracket 320, a driving unit 340, and a circuit board 350.

Hereinafter, technical features will be described in detail with reference to FIGS. 2A and 2B.

First, referring to FIG. 2A, the camera module 201 of the embodiment includes a circuit board 350, an image sensor (not shown) disposed on the circuit board 350, and a lens unit 220 disposed on the image sensor and a housing 210 accommodating the lens unit 220. The image sensor, the lens unit 220 and the housing 210 may be referred to as a lens module 200.

The camera module 201 of the embodiment may include a separate AF driver, for example, VCM, MEMS, piezo, liquid lens, or the like.

In the embodiment, the image sensor substrate may be integrally formed with the circuit board 350 or may be formed separately. For example, in the embodiment, when the substrate of the image sensor is formed separately from the circuit board 350, it may be electrically connected to each other.

In addition, the camera module 201 of the embodiment includes a gyro sensor (not shown) disposed on the circuit board 350 to detect motion, and a module driving unit that drives the lens module 200 according to input/output signals from the gyro sensor and a driving circuit element (not shown) for controlling the module driver 300.

The module driving unit 300 includes a first bracket 310 supporting and driving the lens module 200, and a second bracket 320 accommodating the first bracket 310 and a driving unit 340 to drive the first bracket 310.

The module driving unit 300 may move the lens module 200 coupled to the first bracket 310 with respect to the x, y, and z axes in pitch, yaw, and roll.

The first bracket 310 supports the lens module 200 and a configuration of the module driving unit 300, for example, a coil or the like, and performs Pitch, Yaw, and Roll operations together with the AF function of the lens module 200.

The second bracket 320 may be a fixed part for accommodating the first bracket 310 but performing pitch, yaw, and roll operations of the lens module 200 through the first bracket 310.

In the embodiment, the second bracket 320 may be fixed to the mobile phone, and the first bracket 310 may be attached to the camera module to guide the operation of the camera module.

Referring to FIG. 9 for a moment, the first bracket 310 and the second bracket 320 may be connected by a predetermined spring 400, through which the initial position of the lens module 200 may be set. The spring 400 may include an outer support part 410, a spring part 420, and an inner support part 430. The outer support part 410 may be supported or fixed to the second bracket 320, and the inner support part 430 may be supported or fixed to the first bracket 310.

Meanwhile, in another embodiment, an initial position of the lens module 200 may be set between the first bracket 310 and the second bracket 320 by a predetermined magnetic force.

Next, FIG. 10 is an exemplary view of coupling the spring 400 and the first bracket 310 in the embodiment.

For example, the inner support part 430 of the spring 400 may be supported or fixed to the first bracket 310.

Referring back to FIG. 2A, the camera module 201 of the embodiment includes a shield can (not shown) on the outer surface of the lens module 200, the first bracket 310, and the second bracket 320. The shield can may be referred to as a cover housing. The shield can is formed of a metal material such as steel (SUS), and may shield electromagnetic waves flowing into and out of the camera module, and also prevent foreign matter from entering the camera module.

Next, in the camera module 201 of the embodiment, the image sensor uses a solid-state image sensor such as a CMOS (Complementary Metal Oxide Semiconductor Image Sensor) or a CCD (Charge Coupled Device), and an analog electrical signal output from the solid-state image sensor as a digital value. It may include an analog-to-digital converter for conversion and output.

In the embodiment, the lens unit 220 may be equipped with a predetermined barrel (not shown) and a lens (not shown). The lens may include a single lens or a plurality of lenses. The lens may comprise a liquid lens.

In an embodiment, an actuator (not shown) capable of driving the lens unit 220 may be disposed on the housing 210. The actuator may be a voice coil motor, a micro actuator, a silicon actuator, a shape memory alloy (SAM), etc., and may be applied in various ways such as an electrostatic method, a thermal method, a bimorph method, an electrostatic force method, a piezo actuator, etc.

For example, according to an embodiment, the actuator may support the lens unit 220 and perform an auto-focusing function by moving the lens up and down in response to a control signal from a predetermined control unit.

The lens module 200 may include a voice coil motor, a MEMS actuator, and a piezo actuator to move the lens up and down, and other embodiments may include a liquid lens in addition to the lens without a separate actuator.

The voice coil motor moves the entire lens of the lens module up and down, the MEMS and piezo actuators move some lenses of the lens module up and down, and the liquid lens adjusts the focus by changing the curvature of the interface between the two liquids.

In an embodiment, the gyro sensor may employ a two-axis gyro sensor that detects two rotational motion amounts of pitch and yaw representing a large motion in a two-dimensional image frame, and for more accurate camera shake correction. It is also possible to employ a three-axis gyro sensor that detects the amount of movement of the pitch, yaw and roll. Movements corresponding to the pitch, yaw, and roll detected by the gyro sensor may be converted into an appropriate physical quantity according to a camera shake correction method and a correction direction.

Next, referring to FIGS. 2A and 2B together, in the embodiment, the circuit board 350 may include any substrate having a wiring pattern that can be electrically connected, such as a rigid printed circuit board (rigid PCB), a flexible printed circuit board (flexible PCB), and a rigid flexible printed circuit board (rigid-flexible PCB).

For example, referring to FIG. 2B, the circuit board 350 may include a first circuit board 351, a second circuit board 352, and a third circuit board 353. The first circuit board 351 may be a rigid printed circuit board (rigid PCB), and the second circuit board 352 may be a flexible printed circuit board (flexible PCB) or a rigid-flexible PCB. The third circuit board 353
may be a rigid circuit board, but is not limited thereto.

In this case, the second circuit board 352 may be arranged in a curved shape in the form of a flexible circuit board.

The first circuit board 351 may be fixed to the second bracket 320, and the third circuit board 353 may be electrically connected to the lens module 200, but is not limited thereto.

Referring to FIG. 2A, in an embodiment, the second bracket 320 may include a plurality of second recesses 320R2. For example, the second bracket 320 may have a second recess 320R2 on each of the four sides.

According to the embodiment, other components other than the circuit board may be disposed in the area of the second recess 320R2, thereby increasing the efficiency of space, thereby enabling a more compact configuration.

In the embodiment, the second circuit board 352 is disposed in the area of the second recess 320R2 of the second bracket 320 to have a unique effect of dispersing tension caused by the second circuit board 352. In addition, since interference with the second bracket 320 can be prevented, mechanical and electrical reliability can be remarkably improved.

For example, referring to FIG. 2B, the second circuit board 352 may be separately disposed in the second recess 320R2 of the second bracket 320. Through this, there is a unique effect of dispersing the tension received by the second circuit board 352, and thus there is a technical effect that can significantly improve mechanical and electrical reliability.

In addition, in the embodiment, since the second circuit board 352 is disposed in the second recess 320R2 of the second bracket 320, interference between the second circuit board 352 and the driver 240 can be prevented such that the electrical reliability can be also improved.

Next, FIG. 4A is a cross-sectional perspective view of the camera module 201 along line A1-A1' according to the embodiment shown in FIG. 2A, and FIG. 4B is a cross-sectional view taken along line A-A1' of the camera module 201 according to the embodiment shown in FIG. 2A, and FIG. 5 is a partially enlarged view of the first area B1 of the camera module according to the embodiment shown in FIG. 4B.

According to an embodiment, the first bracket 310 may include a plurality of first recesses 310R1. For example, the first bracket 310 may have a first recess 310R1 region on each side of four surfaces.

According to the embodiment, the first bracket 310 can be precisely injected by having the first recess 310R1 region, and can contribute to miniaturization such that the operation speed can be improved according to weight reduction. A protrusion may be formed at a position corresponding to the ball bearing 316 in the first recess region 310R1.

In an embodiment, the second bracket 320 may also include a plurality of second recesses 320R2. For example, the second bracket 320 may have a second recess 320R2 on each of the four sides.

In addition, the first bracket 310 may include a plurality of ball receiving parts 312 in which the ball bearings 316 are disposed. For example, the first bracket 310 may have a ball receiving part 312 on each of the four sides.

Next, referring to FIG. 5, the upper and lower first width W1 of the ball receiving part 312 of the first bracket 310 may be larger than the diameter D1 of the ball. For example, the first width W1 may be 1.1 to 1.5 times the size of the ball diameter D1. Accordingly, it is possible to secure a moving space of the lens module while Yaw and Pith driving. In an embodiment, the upper and lower first width W1 of the ball receiving part 312 of the first bracket 310 may be 1.2 times the diameter of the ball D1, but are not limited thereto.

In the embodiment, the ball diameter D1 may be about 0.4 mm to 0.8 mm, but is not limited thereto. In the embodiment, the ball diameter D1 may be 0.6 mm, but is not limited thereto.

Referring to FIG. 5, in the embodiment, the first bracket 310 includes a first round surface 310S having a curved side surface, and the second bracket 320 may include a second round surface (320S) having a curved surface corresponding to the first round surface 310S. The curvature of the first round surface 310S may be the same as the curvature of the second round surface 320S, but is not limited thereto.

Accordingly, according to an embodiment, in the first bracket 310 and the second bracket 320, the first round surface 310S and the second round surface 320S, which are curved surfaces, respectively have the same curvature, so that when the yaw, pitch or roll is driven, it can be driven without interference by maintaining a distance from each other.

In the embodiment, the first bracket 310 and the second bracket 320 may be spaced apart by a predetermined distance by the ball bearing 316, and the embodiment may be spaced 0.2 mm apart. In addition, other embodiments may be spaced 0.2~0.5 mm apart.

The first round surface 310S may be disposed on an outer side end surface of the first bracket 310, and the second round surface 320S may be disposed on an inner side end surface of the second bracket 320.

According to the embodiment, the first bracket 310 and the second bracket 320 are provided with a first round surface 310S and a second round surface 320S, which are curved surfaces, respectively, so that the driving unit 340 can smoothly perform roll, yaw or pitch driving of the lens module 200.

In the embodiment, the upper end of the first bracket 310 is disposed lower than the upper end of the second bracket 320 so that the roll driving of the lens module 200 can be smoothly performed.

In addition, in the embodiment, the lower end of the first bracket 310 is disposed higher than the lower end of the second bracket 320 so that at least one of the roll, yaw, and pitch of the lens module 200 can be smoothly performed.

Also, referring to FIG. 5, in an embodiment, a lower end of the second bracket 320 may be provided with a stopper part 320B to function as a stopper for stopping the movement of the first bracket 310.

In addition, referring to FIG. 5, since the first bracket 310 has a region of the first recess 310R1, precise injection is possible, contributing to miniaturization, and an operation speed may be improved according to weight reduction.

Next, FIG. 6A is a cross-sectional view along line A2-A2' of the camera module according to the embodiment shown in FIG. 2A, and FIG. 6B is a partially enlarged view of a second area B2 of the camera module according to the embodiment shown in FIG. 6A. And FIG. 6C is a partially enlarged view of the third area B3 of the camera module according to the embodiment illustrated in FIG. 6A.

In the embodiment, the first bracket 310 may include a plurality of ball receiving parts 312 in which the ball bearings 316 are disposed. For example, the first bracket 310 may have a ball receiving part 312 on each of the four sides.

In this case, in the embodiment, the first bracket 310 may include a first round surface 310S having a curved side surface.

In an embodiment, the first round surface 310S of the first bracket 310 includes at least two first unit round surfaces 310SR1, 310SR2, 310SR3, 310SR4, and the two first unit round surfaces 310SR1, 310SR2, 310SR3, 310SR4 may be disposed opposite to each other around the lens module 200.

For example, the first bracket 310 includes the first-first to first-fourth unit round surfaces 310SR1, 310SR2, 310SR3, 310SR4, and the first-first and first-second unit round surfaces 310SR1 and 310SR2 may be disposed opposite each other around the lens module 200. In addition, the first-third and first-fourth unit round surfaces 310SR3 and 310SR4 may be disposed opposite to each other around the lens module 200.

The first unit round surface may be referred to as an inclined side pillar.

The first bracket 310 of the embodiment may include a plurality of inclined side pillars and vertical side pillars disposed between each inclined side pillar.

For example, the first bracket 310 may include a first-first inclined side pillars to a first-fourth inclined side pillars 310SR1, 310SR2, 310SR3, 310SR4 and a first-first to a first-fourth vertical side pillars 310SVR1, 310SV2, 310SV3, and 310SV4 disposed between each of the inclined side pillars on the side of four surfaces.

The first-first inclined side pillar 310SR1 and the first-second inclined side pillar 310SR2 may be arranged to be symmetrical to each other, and the first-third inclined side pillar 310SR3 and the first-fourth inclined side pillar 310SR4 may also be arranged to be symmetrical to each other.

In addition, in the embodiment, the second bracket 320 may also include a second round surface 320S having a curved side surface.

In an embodiment, the second round surface 320S of the second bracket 320 includes at least two second unit round surfaces 320SR1, 320SR2, 320SR3, and 320SR4, and the two second unit round surfaces 320SR1, 320SR2, 320SR3, and 320SR4 may be disposed opposite to each other around the lens module 200.

For example, the second bracket 320 includes second-first to second-fourth unit round surfaces 320SR1, 320SR2, 320SR3, and 320SR4, and the second-first to second-second unit round surfaces 320SR1 and 320SR2 may be disposed opposite to each other around the lens module 200. In addition, the second-third to second-fourth unit round surfaces 320SR3 and 320SR4 may be disposed opposite to each other around the lens module 200.

The second unit round surface may be referred to as an inclined side pillar.

For example, the second round surface 320S of the second bracket 320 may include a second-first inclined side pillars to a second-fourth inclined side pillars 320SR1, 320SR2, 320SR3, and 320SR4, and may include vertical side pillars 320SV1, 320SV2, 320SV3, and 320SV4 disposed between the inclined side pillars respectively.

The second-first inclined side pillar 320SR1 and the second-second inclined side pillar 320SR2 may be arranged to be symmetrical to each other, and the second-third inclined side pillar 320SR3 and the second-fourth inclined side pillar 320SR4 may also be arranged to be symmetrical to each other.

In the embodiment, the ball receiving part 312 may be disposed between the first round surface 310S of the first bracket 310 and the second round surface 320S of the second bracket 320.

For example, the ball receiving part 312 may be disposed between a first-first unit round surface to a first-fourth unit round surface 310SR1, 310SR2, 310SR3, 310SR4, and a second-first unit round surface to second-fourth unit round surfaces 320SR1, 320SR2, 320SR3, and 320SR4, respectively corresponding to each other.

In the embodiment, the first bracket 310 can include a first-first unit round surface to a first-fourth unit round surface 310SR1, 310SR2, 310SR3, 310SR4, but may not include vertical side pillars 310SV1, 310SV2, 310SV3, 310SV4.

That is, in an embodiment, the first bracket 310 may have a structure in which the first-first unit round surfaces to the first-fourth unit round surfaces 310SR1, 310SR2, 310SR3, and 310SR4 connected to each other.

When the first bracket 310 of the embodiment does not include the vertical side pillars 310SV1, 310SV2, 310SV3, 310SV4, the housing of the lens module and the first-first unit round surface to the first-fourth unit round surface 310SR1, 310SR2, 310SR3, 310SR4 may be integrally formed, but are not limited thereto.

When the yaw and pitch driving are described with reference to FIGS. 6A and 2B together, in the embodiment, when the first-first unit round surface 310SR1 is raised and the first-second unit round surface 310SR2 goes down, the yaw function can be performed. In addition, in an embodiment, when the first-third unit round surface 310SR3 is raised and the first-fourth unit round surface 310SR4 is lowered, a pitch function may be performed, but the present invention is not limited thereto.

Next, FIG. 6B is a partially enlarged view of the second area B2 of the camera module according to the embodiment illustrated in FIG. 6A.

In the embodiment, the ball receiving part 312 provided in the first bracket 310 may have a V-shaped shape. In addition, the ball bearing 316 may contact the first bracket 310 and the second bracket 320 in three points as a whole.

For example, in the embodiment, the ball receiving part 312 provided on the first bracket 310 includes a first inclined surface 312S1, a second inclined surface 312S2, and a bottom surface 312B, thereby it can form a V-shaped rail.

For example, in the embodiment, the ball receiving part 312 of the first bracket 310 may have a V-shaped rail formed in the z-axis direction. The ball bearing 316 may contact the first bracket 310 at two points and contact the second bracket 320 at one point such that three point contact can be made.

Meanwhile, the horizontal cross section of the ball receiving part 312 may have a circular shape.

In an embodiment, the first-first unit round surface 310SR1 of the first bracket 310 may have a round protrusion 310SP in an opposite area corresponding to the ball receiving part 312. The round surfaces 310SR2, 310SR3, and 310SR4 of the first-second, first-third, and first-fourth units may also have a round protrusion 310SP in an opposite region corresponding to the ball receiving part 312.

According to an embodiment, the first-first, first-second, first-third, first-fourth unit round surfaces 310SR1, 310SR2, 310SR3, 310SR4 may have the round protrusion 310SP protruding into the first recessed area 310R1 in the opposite area corresponding to the ball receiving part 312 such that the embodiment can provide a space in which the ball receiving part 312 can be formed, and the ball receiving part 312 is formed in a solid structure to form a ball bearing thereby the reliability of the rolling drive of 316 can be improved.

Next, FIG. 6C is a partially enlarged view of the third area B3 of the camera module according to the embodiment illustrated in FIG. 6A.

In an embodiment, the first bracket 310 may include a first-second recess 310R2 between the first-first unit round surface 310SR1 and the first-first vertical column 310SV1.

In addition, in an embodiment, the second bracket 320 may include a second-first protrusion 320SP1 between the second-first unit round surface 320SR1 and the second-first vertical pillar 320SV1.

The second-first protrusion 320SP1 may allow the first bracket 310 to be disposed in the first-second recess 310R2 so that Yaw, pitch, or roll driving can be smoothly performed.

In addition, the second-first protrusion 320SP1 may function as a stopper when the first bracket 310 is rolled.

Next, FIG. 7 is a perspective view of the first bracket 310 and the driving unit 340 in the camera module according to the embodiment shown in FIG. 2A, and FIGS. 8A and 8B are exemplary views of driving the camera module according to the embodiment.

In the embodiment, the driving unit 340 may include a first driving unit 341 and a second driving unit 342.

The driving unit 340 may be coupled to the lens module, but is not limited thereto.

Referring to FIG. 7, the first driving unit 341 may include a first magnet 341m and a first coil unit 341c to induce a force F1 in a first direction. For example, the first driving unit 341 may include a first magnet 341m and a donut-shaped first coil unit 341c to induce a first force F1 in the z-axis direction.

For example, the first magnet 341m is a magnet in which an n-pole and an s-pole are disposed in a vertical direction, and may induce an electromagnetic force in a vertical direction.

The second driving unit 342 may include a second magnet 342m and a second coil unit 342c to induce a force F2 in the second direction. For example, the second magnet 342m may be seated so that the n-pole or the s-pole horizontally faces the second coil unit 342c to induce a force F2 in the horizontal direction (Y-axis direction).

For example, the second driving unit 342 may include a second magnet 342m and a donut-shaped second coil unit 342c to induce a second force F2 in the y-axis direction.

In addition, in the embodiment, a first yoke 344 may be disposed between the driving unit 340 and the first bracket 310, and the first yoke 344 functions as a back yoke to make the magnetic flux uniform and can prevent it from leaking externally.

In the embodiment, a second yoke (not shown) made of iron may be further provided between the second magnet 342m and the second coil part 342c. For example, a magnetic member such as a second yoke may be inserted and disposed inside the second coil unit 342c. Through this, a second yoke may be provided at the center of the second coil part 342c, and a solenoid may be implemented with the yoke and the second coil part 342c. By implementing a solenoid, force to push and pull the magnet can be generated.

According to FIG. 7, the first and second coils 341c and 342c are attached to the first bracket 310, and the first and second magnets 341m and 342m are separated from the coils. A structure in which the first, second magnets 341m and 342m are attached to the first bracket 310 and the coils are separated from magnets may also be possible.

Through this, roll driving or Yaw/Pitch tilting driving may be possible as shown in FIGS. 8A and 8B.

For example, referring to FIG. 8A, roll driving may be possible according to the embodiment.

Referring to FIG. 6C for a moment, in the embodiment, the second-first protrusion 320SP1 may allow the first bracket 310 to be disposed in the first-second recess 310R2 so that the roll driving can proceed smoothly.

Also, in the second-first protrusion 320SP1, the first bracket 310 may function as a roll driving stopper.

In addition, referring to FIG. 8B, it may be possible to drive Yaw/Pitch tilting according to an embodiment.

Referring to FIG. 5 for a moment, in the embodiment, the first bracket 310 includes a first round surface 310S having a curved side surface. And the second bracket 320 is attached to the first round surface 310S and may include a second round surface 320S having a corresponding curved surface. The curvature of the first round surface 310S may be the same as the curvature of the second round surface 320S, but is not limited thereto.

Accordingly, according to an embodiment, in the first bracket 310 and the second bracket 320, the first round surface 310S and the second round surface 320S, which are curved surfaces, respectively have the same curvature, so that when yaw, pitch or roll is driven, it can be driven without interference by maintaining a distance from each other.

The first round surface 310S may be disposed on an outer side end surface of the first bracket 310, and the second round surface 320S may be disposed on an inner side end surface of the second bracket 320.

According to the embodiment, the first bracket 310 and the second bracket 320 are provided with a first round surface 310S and a second round surface 320S, which are curved surfaces, respectively, so that the driving unit 340 can provide a smooth driving of the lens module 200 for roll, yaw or pitch.

In the embodiment, the upper end of the first bracket 310 is disposed lower than the upper end of the second bracket 320 so that the roll driving of the lens module 200 can be smoothly performed.

In addition, in the embodiment, the lower end of the first bracket 310 is disposed higher than the lower end of the second bracket 320 so that at least one of the roll, yaw, and pitch of the lens module 200 can be smoothly performed.

Also, referring to FIG. 5, in an embodiment, a lower end of the second bracket 320 may be provided with a stopper part 320B to function as a stopper for stopping the movement of the first bracket 310.

According to the embodiment, a rotation angle of about 0.8 to 2.0° (including a rotation angle of 1°) can be secured by Roll driving or Yaw/Pitch tilting driving, thereby performing an effective OIS function.

The embodiment may provide a camera module capable of providing an excellent OIS function without distortion of image quality even when photographing a video, and an actuator for the camera module.

In addition, the embodiment has a technical effect capable of providing a micro-camera module at the same time as the technical effect described above.

Features, structures, effects, and the like described in the above embodiments are included in at least one embodiment, and are not necessarily limited to only one embodiment. Furthermore, the features, structures, effects, and the like illustrated in each embodiment may be combined or modified for other embodiments by a person having ordinary knowledge in the field to which the embodiments belong. Therefore, contents related to such combinations and modifications should be interpreted as being included in the scope of the embodiments.

Although the embodiments have been described above, these are only examples and are not intended to limit the embodiments, and those of ordinary skill in the field to which the embodiments belong are not departing from the essential characteristics of the embodiments. It will be seen that branch transformation and application are possible. For example, each component specifically shown in the embodiment can be modified and implemented. And differences related to these modifications and applications should be construed as being included in the scope of the embodiments set in the appended claims.

INDUSTRIAL APPLICABILITY

The camera module of the embodiment may include a separate AF driver, for example, VCM, MEMS, piezo, liquid lens, and the like.

In the embodiment, the image sensor substrate may be formed integrally with the circuit board or may be formed separately.

In addition, the camera module of the embodiment includes a gyro sensor (not shown) disposed on the circuit board to detect movement, a module driver for driving the lens module according to input/output signals from the gyro sensor, and a driving circuit for controlling the module driver including an element (not shown).

In the camera module of the embodiment, the lens module may include a voice coil motor, a MEMS actuator, and a piezo actuator to move the lens up and down, and other embodiments may include a liquid lens in addition to the lens without a separate actuator.

The invention claimed is:
1. A camera module comprising:
a lens module;
a first bracket including a first round surface and moving while being coupled to the lens module;
a second bracket including a second round surface corresponding to the first round surface;
a ball bearing disposed between the first round surface of the first bracket and the second round surface of the second bracket; and
a driving unit disposed between the lens module and the second bracket,
wherein the first round surface is disposed on an outer perimeter of the first bracket, and the second round surface is disposed on an inner perimeter of the second bracket, and
wherein the first bracket includes a plurality of inclined side pillars and vertical side pillars disposed between each inclined side pillar.
2. The camera module according to claim 1, wherein the ball bearing moves along the first round surface and the second round surface so that the lens module rotates based on the optical axis.
3. The camera module according to claim 1, wherein the ball bearing is moved along the first round surface and the second round surface so that the lens module is tilted with respect to a virtual plane perpendicular to the optical axis.
4. The camera module according to claim 1, wherein an upper end of the first bracket is disposed lower than an upper end of the second bracket.
5. The camera module according to claim 1, wherein the first bracket comprises a first recess region formed on an inner surface of the first bracket and disposed at a position corresponding to the first round surface.
6. The camera module according to claim 5, wherein the first bracket includes a ball receiving part in which the ball bearing is disposed, and the ball receiving part is disposed at a position corresponding to the first recess region.
7. The camera module according to claim 1, wherein the second bracket comprises a second recess region formed on an outer surface of the second bracket and disposed at a position corresponding to the second round surface.

8. The camera module according to claim 7, wherein the first round surface of the first bracket includes a round protrusion in an opposite area corresponding to the ball receiving part.

9. The camera module according to claim 1, wherein the first bracket includes a recess,
wherein the second bracket includes a protrusion,
wherein the protrusion allows the first bracket to be disposed in the recess so that yaw, pitch, or roll driving can be smoothly performed, and
wherein the protrusion functions as a stopper when the first bracket is rolled.

10. A camera module comprising:
a lens module;
a first bracket including a first round surface and moving while being coupled to the lens module;
a second bracket including a second round surface corresponding to the first round surface;
a ball bearing disposed between the first round surface of the first bracket and the second round surface of the second bracket; and
a driving unit disposed between the lens module and the second bracket,
wherein the first bracket includes a plurality of inclined side pillars and vertical side pillars disposed between each inclined side pillar.

11. The camera module according to claim 10, wherein the first round surface is disposed on an outer surface of the first bracket, and the second round surface is disposed on an inner surface of the second bracket.

12. The camera module according to claim 10, wherein the first bracket includes first-first inclined side pillars to first-fourth inclined side pillars and first-first to first-fourth vertical side pillars disposed between each of the inclined side pillars on the side of four surfaces.

13. The camera module according to claim 12, wherein the first-first inclined side pillar and the first-second inclined side pillar are arranged to be symmetrical to each other, and the first-third inclined side pillar and the first-fourth inclined side pillar are arranged to be symmetrical to each other.

14. The camera module according to claim 10, wherein the second bracket includes second-first inclined side pillars to second-fourth inclined side pillars and includes vertical side pillars disposed between the inclined side pillars respectively.

15. A camera module comprising:
a lens module;
a circuit board under the lens module;
a first bracket including a first round surface and moving while being coupled to the lens module;
a second bracket including a second round surface corresponding to the first round surface;
a ball bearing disposed between the first round surface of the first bracket and the second round surface of the second bracket; and
a driving unit disposed between the lens module and the second bracket,
wherein the first round surface is disposed on an outer perimeter of the first bracket, and the second round surface is disposed on an inner perimeter of the second bracket,
wherein the second bracket comprises a second recess region formed on an outer surface of the second bracket and disposed at a position corresponding to the second round surface,
wherein the circuit board includes a first circuit board, a third circuit board and a second circuit board between the first circuit board and the third circuit board, and
wherein the second circuit board is disposed in the second recess region of the second bracket.

16. The camera module according to claim 15, wherein the first bracket includes a plurality of inclined side pillars and vertical side pillars disposed between each inclined side pillar, and
wherein the first bracket includes first-first inclined side pillars to first-fourth inclined side pillars and first-first to first-fourth vertical side pillars disposed between each of the inclined side pillars on the side of four surfaces.

17. A camera module comprising:
a lens module;
a first bracket including a first round surface and moving while being coupled to the lens module;
a second bracket including a second round surface corresponding to the first round surface;
a ball bearing disposed between the first round surface of the first bracket and the second round surface of the second bracket; and
a driving unit disposed between the lens module and the second bracket,
wherein the first round surface of the first bracket includes at least two first unit round surfaces, and the two first unit round surfaces are disposed opposite to and facing each other around the lens module,
wherein the second round surface of the second bracket includes at least two second unit round surfaces, and each of the at least two second unit round surfaces is disposed to correspond to each of the at least two first unit round surfaces,
wherein the first bracket includes a plurality of inclined side pillars and vertical side pillars disposed between each inclined side pillar, and
wherein the first bracket includes first-first inclined side pillars to first-fourth inclined side pillars and first-first to first-fourth vertical side pillars disposed between each of the inclined side pillars on the side of four surfaces.

\* \* \* \* \*